United States Patent
Koski et al.

(10) Patent No.: US 9,342,058 B2
(45) Date of Patent: May 17, 2016

(54) COMMUNICATION WITH LIGHTING UNITS OVER A POWER BUS

(75) Inventors: John A. Koski, Lafayette, CO (US); Anthony Catalano, Boulder, CO (US)

(73) Assignee: TerraLUX, Inc., Longmont, CO (US)

( * ) Notice: Subject to any disclaimer, the term of this patent is extended or adjusted under 35 U.S.C. 154(b) by 433 days.

(21) Appl. No.: 13/234,343

(22) Filed: Sep. 16, 2011

(65) Prior Publication Data

US 2012/0068618 A1   Mar. 22, 2012

Related U.S. Application Data

(60) Provisional application No. 61/383,506, filed on Sep. 16, 2010, provisional application No. 61/383,517, filed on Sep. 16, 2010.

(51) Int. Cl.
| | |
|---|---|
| *H05B 37/02* | (2006.01) |
| *G05B 11/01* | (2006.01) |
| *H05B 33/08* | (2006.01) |

(52) U.S. Cl.
CPC ............ *G05B 11/01* (2013.01); *H05B 33/0851* (2013.01); *H05B 37/0263* (2013.01)

(58) Field of Classification Search
CPC .............................................. H04B 2203/5416
USPC ..................... 315/240, 297, 311; 340/310.12; 323/369, 364, 353, 354
See application file for complete search history.

(56) References Cited

U.S. PATENT DOCUMENTS

| | | | |
|---|---|---|---|
| 4,085,403 A | | 4/1978 | Meier et al. |
| 4,529,949 A | | 7/1985 | De Wit et al. |
| 4,633,161 A | | 12/1986 | Callahan |
| 5,291,607 A | | 3/1994 | Ristic et al. |
| 5,401,099 A | | 3/1995 | Nishizawa et al. |
| 5,485,576 A | | 1/1996 | Fee et al. |
| 5,506,490 A | | 4/1996 | DeMuro |
| 5,546,041 A | | 8/1996 | Szajda |
| 5,691,691 A | * | 11/1997 | Merwin et al. ................ 375/259 |
| 5,783,909 A | | 7/1998 | Hochstein |
| 5,925,990 A | | 7/1999 | Crouse et al. |
| 6,097,761 A | * | 8/2000 | Buhring et al. ............... 375/257 |
| 6,153,985 A | | 11/2000 | Grossman |
| 6,332,710 B1 | | 12/2001 | Aslan et al. |

(Continued)

FOREIGN PATENT DOCUMENTS

| | | |
|---|---|---|
| AU | 2011301977 B2 | 5/2014 |
| CN | 2924996 | 7/2007 |

(Continued)

OTHER PUBLICATIONS

International Search Report and Written Opinion mailed Feb. 6, 2012 for International Application No. PCT/US2011/051883 (12 pages).

(Continued)

*Primary Examiner* — Alexander H Taningco
*Assistant Examiner* — David Lotter
(74) *Attorney, Agent, or Firm* — Neugeboren O'Dowd PC

(57) ABSTRACT

A first entity communicates with a second entity over a shared power bus by switching the bus to a high-impedance state and modifying the voltage on the power bus, in accordance with an outgoing communication, such that the modified voltage is detected by the second entity and the communication is received thereto.

19 Claims, 9 Drawing Sheets

(56) References Cited

U.S. PATENT DOCUMENTS

| | | |
|---|---|---|
| 6,351,079 B1 | 2/2002 | Willis |
| 6,382,812 B1 | 5/2002 | Hsu |
| 6,693,394 B1 | 2/2004 | Guo et al. |
| 6,713,974 B2 | 3/2004 | Patchornik et al. |
| 6,762,629 B2 | 7/2004 | Tam et al. |
| 6,842,668 B2 | 1/2005 | Carson et al. |
| 6,870,325 B2 | 3/2005 | Bushell et al. |
| 6,930,737 B2 | 8/2005 | Weindorf et al. |
| 7,029,145 B2 | 4/2006 | Frederick |
| 7,034,507 B2 | 4/2006 | Lovett |
| 7,049,765 B1 | 5/2006 | Tremaine, Sr. |
| 7,119,498 B2 | 10/2006 | Baldwin et al. |
| 7,126,290 B2 | 10/2006 | Elliott |
| 7,150,561 B1 | 12/2006 | D'Aquino et al. |
| 7,196,481 B2 | 3/2007 | Bushell et al. |
| 7,204,638 B2 | 4/2007 | Hsu et al. |
| 7,233,258 B1 | 6/2007 | Gelinas |
| 7,242,150 B2 | 7/2007 | DeJonge et al. |
| 7,245,089 B2 | 7/2007 | Yang |
| 7,245,090 B2 | 7/2007 | Yang |
| 7,262,559 B2 | 8/2007 | Tripathi et al. |
| 7,286,123 B2 | 10/2007 | Yang |
| 7,322,718 B2 | 1/2008 | Setomoto et al. |
| 7,330,002 B2 | 2/2008 | Joung |
| 7,358,679 B2 | 4/2008 | Lys et al. |
| 7,423,750 B2 | 9/2008 | Hoshizaki et al. |
| 7,429,129 B2 | 9/2008 | St. Pierre et al. |
| 7,492,108 B2 | 2/2009 | Garcia et al. |
| 7,504,783 B2 | 3/2009 | Zarr |
| 7,507,001 B2 | 3/2009 | Kit |
| 7,546,473 B2 | 6/2009 | Newman |
| 7,556,423 B2 | 7/2009 | Caliboso |
| 7,626,346 B2 | 12/2009 | Scilla |
| 7,628,507 B2 | 12/2009 | Allen et al. |
| 7,635,957 B2 | 12/2009 | Tripathi et al. |
| 7,656,307 B2 | 2/2010 | Yatsuda et al. |
| 7,656,371 B2 | 2/2010 | Shimizu et al. |
| 7,663,326 B2 | 2/2010 | Santo et al. |
| 7,728,401 B2 | 6/2010 | Takatori |
| 7,755,513 B2 | 7/2010 | Wang et al. |
| 7,777,430 B2 | 8/2010 | Catalano et al. |
| 7,791,326 B2 | 9/2010 | Dahlman et al. |
| 7,792,167 B2 | 9/2010 | Kanesaka |
| 7,800,316 B2 | 9/2010 | Haug |
| 7,800,567 B2 | 9/2010 | Fujino |
| 7,812,551 B2 | 10/2010 | Hite et al. |
| 7,817,009 B2 | 10/2010 | Wang et al. |
| 7,888,877 B2 | 2/2011 | Tsai et al. |
| 7,892,870 B2 | 2/2011 | Shi |
| 7,911,156 B2 | 3/2011 | Cottongim et al. |
| 7,911,438 B2 | 3/2011 | Okazaki |
| 7,947,947 B2 | 5/2011 | Ackermann et al. |
| 7,948,190 B2 | 5/2011 | Grajcar |
| 7,948,398 B2 | 5/2011 | Miller |
| 7,986,112 B2 | 7/2011 | West |
| 7,990,077 B2 | 8/2011 | Yu et al. |
| 7,994,725 B2 | 8/2011 | Bouchard |
| 2002/0048177 A1 | 4/2002 | Rahm et al. |
| 2003/0123521 A1 | 7/2003 | Luoma |
| 2004/0164688 A1 | 8/2004 | Van Tichelen et al. |
| 2005/0057184 A1 | 3/2005 | Kaneko et al. |
| 2006/0038661 A1* | 2/2006 | Reinhold et al. ......... 340/310.11 |
| 2006/0119288 A1 | 6/2006 | Ayala et al. |
| 2006/0125773 A1 | 6/2006 | Ichikawa et al. |
| 2006/0214876 A1 | 9/2006 | Jendbro et al. |
| 2006/0237636 A1 | 10/2006 | Lyons et al. |
| 2006/0238169 A1 | 10/2006 | Baker |
| 2007/0040518 A1 | 2/2007 | Young |
| 2007/0057902 A1 | 3/2007 | Joung et al. |
| 2007/0121324 A1 | 5/2007 | Nakano |
| 2007/0291483 A1 | 12/2007 | Lys |
| 2008/0018261 A1 | 1/2008 | Kastner |
| 2008/0062070 A1 | 3/2008 | De Oto et al. |
| 2008/0088557 A1 | 4/2008 | Choi |
| 2008/0111505 A1 | 5/2008 | Wang et al. |
| 2008/0151965 A1 | 6/2008 | Kim |
| 2008/0198613 A1 | 8/2008 | Cruickshank |
| 2008/0204884 A1 | 8/2008 | Jang |
| 2008/0231198 A1 | 9/2008 | Zarr |
| 2008/0238340 A1 | 10/2008 | Leung et al. |
| 2008/0258636 A1 | 10/2008 | Shih et al. |
| 2008/0287742 A1 | 11/2008 | St. George et al. |
| 2008/0319690 A1 | 12/2008 | Meadows et al. |
| 2009/0021178 A1 | 1/2009 | Furukawa et al. |
| 2009/0021955 A1 | 1/2009 | Kuang et al. |
| 2009/0097244 A1 | 4/2009 | Lan et al. |
| 2009/0146584 A1 | 6/2009 | Ye et al. |
| 2009/0154525 A1 | 6/2009 | Dai et al. |
| 2009/0167203 A1 | 7/2009 | Dahlman et al. |
| 2009/0179574 A1 | 7/2009 | Chang |
| 2009/0179848 A1 | 7/2009 | Schmidt et al. |
| 2009/0212736 A1 | 8/2009 | Baarman et al. |
| 2009/0251059 A1 | 10/2009 | Veltman |
| 2009/0267523 A1 | 10/2009 | Phillips |
| 2009/0289965 A1 | 11/2009 | Kurokawa et al. |
| 2009/0302783 A1 | 12/2009 | Wang et al. |
| 2009/0306912 A1 | 12/2009 | Chen et al. |
| 2010/0007588 A1 | 1/2010 | Zygmunt et al. |
| 2010/0033095 A1 | 2/2010 | Sadwick |
| 2010/0033112 A1 | 2/2010 | Yen |
| 2010/0039049 A1 | 2/2010 | Hoffman |
| 2010/0066270 A1 | 3/2010 | Yang et al. |
| 2010/0118057 A1 | 5/2010 | Atkins et al. |
| 2010/0134020 A1 | 6/2010 | Peng et al. |
| 2010/0157583 A1 | 6/2010 | Nakajima |
| 2010/0176746 A1 | 7/2010 | Catalano et al. |
| 2010/0194368 A1 | 8/2010 | Taylor et al. |
| 2010/0203465 A1 | 8/2010 | Bria et al. |
| 2010/0244701 A1 | 9/2010 | Chen et al. |
| 2010/0259191 A1 | 10/2010 | Ghanem et al. |
| 2010/0264795 A1 | 10/2010 | Miao |
| 2010/0277077 A1 | 11/2010 | Pong et al. |
| 2010/0295474 A1 | 11/2010 | Chemel et al. |
| 2010/0295688 A1 | 11/2010 | Wu et al. |
| 2010/0320939 A1 | 12/2010 | Lai |
| 2011/0001438 A1 | 1/2011 | Chemel et al. |
| 2011/0019430 A1 | 1/2011 | Wilkinson et al. |
| 2011/0031903 A1 | 2/2011 | Nguyen Hoang et al. |
| 2011/0043120 A1 | 2/2011 | Panagotacos et al. |
| 2011/0062895 A1 | 3/2011 | Ji |
| 2011/0068715 A1 | 3/2011 | Hum |
| 2011/0080099 A1 | 4/2011 | Teng et al. |
| 2011/0089852 A1 | 4/2011 | Segan |
| 2011/0109231 A1 | 5/2011 | Shiu et al. |
| 2011/0115396 A1 | 5/2011 | Horvath et al. |
| 2011/0115400 A1 | 5/2011 | Harrison et al. |
| 2011/0115645 A1 | 5/2011 | Hall et al. |
| 2011/0121751 A1 | 5/2011 | Harrison et al. |
| 2011/0121760 A1 | 5/2011 | Harrison et al. |
| 2011/0147466 A1 | 6/2011 | Kang et al. |
| 2011/0150028 A1 | 6/2011 | Nguyen Hoang et al. |
| 2011/0156593 A1 | 6/2011 | De Greef et al. |
| 2011/0157238 A1 | 6/2011 | Lin et al. |
| 2011/0163696 A1 | 7/2011 | Huang et al. |
| 2011/0199013 A1 | 8/2011 | Cottrell |
| 2012/0068618 A1 | 3/2012 | Koski et al. |
| 2014/0246993 A1 | 9/2014 | Catalano et al. |

FOREIGN PATENT DOCUMENTS

| | | | |
|---|---|---|---|
| CN | 101511143 A | 8/2009 | |
| CN | 103098552 A | 5/2013 | |
| DE | 19725710 | 1/1998 | |
| DE | 19725710 B4 | 5/2006 | |
| EP | 0492117 | 7/1992 | |
| EP | 0657697 | 6/1995 | |
| EP | 0923274 | 6/1999 | |
| EP | 1271799 A1 | 1/2003 | |
| EP | 1313353 | 5/2003 | |
| EP | 1701589 | 9/2006 | |
| EP | 2073607 | 6/2009 | |
| EP | 2273851 | 1/2011 | |
| EP | 2617266 A1 | 7/2013 | |
| GB | 2335334 | * 3/1998 | ............... H04B 3/54 |

(56) References Cited

FOREIGN PATENT DOCUMENTS

| | | |
|---|---|---|
| GB | 2335334 | 9/1999 |
| JP | 57133685 | 8/1982 |
| JP | 2003188415 | 7/2003 |
| JP | 2003317979 | 11/2003 |
| JP | 2009083590 | 4/2009 |
| JP | 2013-543216 A | 11/2013 |
| KR | 2000006665 | 2/2000 |
| KR | 20060098345 | 9/2006 |
| KR | 20070053818 | 5/2007 |
| WO | WO-90/010238 | 9/1990 |
| WO | WO-99/000650 | 1/1999 |
| WO | 9948340 A1 | 9/1999 |
| WO | WO9948340 * 9/1999 | ............. H05B 37/02 |
| WO | WO-00/17728 | 3/2000 |
| WO | WO-2005/081591 | 9/2005 |
| WO | WO-2006/058418 | 6/2006 |
| WO | WO-2009/055821 | 4/2009 |
| WO | WO-2009/079944 | 7/2009 |
| WO | WO-2011/044040 | 4/2011 |
| WO | WO-2011/056242 | 5/2011 |
| WO | 2012/037436 A1 | 3/2012 |

OTHER PUBLICATIONS

International Search Report and Written Opinion mailed Aug. 13, 2010 for International Application No. PCT/US2010/020819 (8 pages).
International Preliminary Report on Patentability mailed Jul. 28, 2011 for International Application No. PCT/US2010/020819 (7 pages).
Examiner Report Received for Australian Application No. 2011301977, mailed on Jan. 30, 2014, 3 pages.
Examiner Report Received for Chinese Application No. 201180044078.8, mailed on Mar. 19, 2014, 10 pages of Official Copy only.
Examination Report Received for European Patent Application No. 11781896.3, mailed on Jan. 5, 2015, 4 pages.
Examination Report Received for Chinese Patent Application No. 201180044078.8, mailed on Feb. 27, 2015, 8 pages. (5 pages of English Translation and 3 pages of Official Copy).
Examination Report Received for Chinese Patent Application No. 201180044078.8, mailed on Sep. 2, 2014, 3 pages. (Official copy only) (in accordance with 37 CFR § 1.98(a) (3)).
PCT International Patent Application No. PCT/US2011/051883, International Preliminary Report on Patentability mailed Mar. 28, 2013, 9 pages.
Singh, Vijay, "AU Office Action re Application No. 2011301977", Jan. 30, 2014, Published in: AU.
Xiaoli, Liao, "Chinese Office Action re Application No. 201180044078.8", Aug. 12, 2015, Published in: CN.
European Patent Office, "EP Office Action re Application No. 11781896.3", Apr. 23, 2013, Published in: EP.
European Patent Office, "EP Office Action re Application No. 11781896.3", Oct. 5, 2015, Published in: EP.
Lotter, David, "US Office Action re U.S. Appl. No. 13/234,343", May 1, 2015, Published in: US.
Lotter, David, "US Office Action re U.S. Appl. No. 13/234,343", Aug. 22, 2013, Published in: US.
Somervell, Thomas, "Response to Office Action re Application No. 11781896.3", Oct. 29, 2013, Published in: EP.
Currie, Matthew T., "Response to Office Action re U.S. Appl. No. 13/234,343", Aug. 14, 2015, Published in: US.
Lin, Ya_Chia, "Response to US Office Action re U.S. Appl. No. 13/234,343", Nov. 21, 2013, Published in: US.

* cited by examiner

COMMUNICATION WITH LIGHTING UNITS OVER A POWER BUS

CROSS-REFERENCE TO RELATED APPLICATIONS

This application claims priority to and the benefit of U.S. Provisional Patent Application Ser. Nos. 61/383,506 and 61/383,517, both filed on Sep. 16, 2010, which are hereby incorporated herein by reference in their entirety.

TECHNICAL FIELD

Embodiments of the invention generally relate to lighting systems having a plurality of light sources that are controlled and managed by a central controller.

BACKGROUND

A lighting system that includes a plurality of light sources may locate circuitry common to all of the light sources, such as a power supply, in a central controller rather than including redundant copies of the circuitry at each light source. A central power supply, for example, may reduce the cost of the lighting system, due to the fewer total components used, as well as reduce the power consumed by the system, allow for smaller and cooler light sources, and provide a more convenient point of access for maintenance or repair. Such a system may distribute a power bus from the central controller to the plurality of light sources, which may be widely distributed across a room, building, or other area.

In addition to distributing power, the central controller may change the brightness, color, or other such property of one or more of the light sources from a single, easily accessible location. Status information, such as temperature, may be sent from the light sources to the central controller, which may automatically adjust a property of the light sources in response to the information or may present the information to a user. The commands to the lights and the information read from the lights, may be sent and received using one or more buses routed, in addition to the power bus, between the central controller and the light sources. More buses may, however, mean more cost added to the system and more difficulty in installing and maintaining the system.

In some systems, the power bus is also used as a command bus by piggybacking a high-frequency communication signal on top of the low-frequency power signal. These systems are, however, susceptible to noise and/or transmission issues, causing commands sent to the lighting units to be misinterpreted or missed and data received from the lighting units to be corrupted. Furthermore, identifying one lighting unit amongst the plurality of units connected to the central controller may be difficult or impossible, preventing individual control of a single lighting unit. This difficulty is compounded in systems where the number of lighting units is not known at the time of manufacture or installation (e.g., lighting units may be added or removed from the system during its installed lifetime) because the central controller may not be able to identify the addition or removal, causing further communication problems.

A need therefore exists for a lighting system featuring a central controller capable of communicating reliably and dynamically with any number of lighting units over a single, combined power and command bus.

SUMMARY

Various aspects of the systems and methods described herein include a lighting system having a central controller and a plurality of light sources located remotely thereto. The central controller and each of the light sources share a common power bus. The central controller sends messages to the light sources by putting the power-supply output into a high-impedance state, thereby allowing manipulation of the power-bus voltage and varies the power-bus voltage in accordance with an outgoing communication. The light sources receive the variations and, hence, the communication encoded therein. The light sources may each have unique identifiers or addresses, so that the central controller may address each light source individually. If two light sources share the same address, the central controller may detect the sharing and send a command to the detected address to force the light sources to choose new addresses.

In one aspect, a method of communication among a plurality of entities connected to a power bus powered by a power supply includes switching a connection between the power bus and the power supply from a low-impedance state to a high-impedance state. A voltage is modified on the power bus, at a first entity connected to the power bus, in accordance with an outgoing communication. The modified voltage is detected, and the communication thereby received, at a second entity connected to the power bus.

The first entity may include a central control unit and the second entity may include a light source; the outgoing communication may include a command to modify a property of the light source. The modified voltage may be detected at an additional light source connected to the common power bus, and the communication may uniquely address the light source or the additional light source. Alternatively, the first entity may include a light source and the second entity may include a central control unit; in this case, the outgoing communication may include a status of the light source.

Modifying the voltage may include applying a negative pulse to the power bus; the negative pulse may have a voltage approximately one-half the voltage of the power supply. The connection between the power bus and the power supply may be switched, after the modified voltage is detected, from the high-impedance state to the low-impedance state. Sending the communications signal may include sending a wake-up signal and/or an entity identification signal, and the communications signal may be encoded. Receiving the communications signal may include detecting a negative pulse on the common power bus and/or placing a messaging load on the common power bus and thereafter strobing a source impedance of the power supply. The entities may include light sources, and a sufficiently constant voltage may be maintained at the light sources to avoid degradation, detectable to a human eye, of emitted light during negative-going pulses.

In another aspect, a system for communicating among a plurality of entities powered by a power supply via a power bus includes an impedance-switching circuit for selecting between a low power-supply output impedance and a high power-supply output impedance. A central controller selects, using the impedance-switching circuit, the high power-supply output impedance and thereafter sends a command over the power bus. A light source receives the command, over the power bus, from the central controller and sends a response over the power bus thereto.

The central controller may include a messaging-load impedance for applying a negative pulse to the common power bus and/or a comparator for detecting a negative pulse on the common power bus. The light source may include a messaging-load impedance for applying a negative pulse to the common power bus and/or a filter capacitor for supplying power to the light source when the high power-supply output impedance is selected. The impedance-switching circuit may include a power FET, silicon-controlled rectifier, and/or a thyristor. The power bus may be an AC or DC bus.

In another aspect, a light source, powered by a power supply via a power bus, communicates with a central controller connected to the power bus. The light source includes an LED light for emitting light and an input circuit for detecting a change in voltage on the power bus initiated by the central controller. A processor interprets the change in voltage as a command. An output circuit modifies the voltage on the power bus, thereby sending a communication to the central controller, in response to the command. A capacitor may be used to provide power to the LED light during a communication.

In another aspect, a method of assigning unique identifiers to a plurality of entities connected to a power bus includes transmitting a query message over the power bus to at least one address in an address space used by the plurality of entities. The power bus is monitored, for at least one queried address, for a response from one or more entities. Based on the response communication, the method detects whether multiple entities share the same address and causes any detected multiple entities to assume a unique address.

Causing the detected multiple entities to assume the unique address may include transmitting an address-reassignment message to each detected multiple entity. A query message may be transmitted to each address in the address space and the power bus may be monitored for every address in the address space. A new address may be generated at a detected multiple entity, and the new address may be based on a random number and/or on an available address range transmitted to the detected multiple entity. The new address may replace an old address or may be an extension of an old address. A table of available, single-occupied, and multiply-occupied addresses may be created based on the response communication. Detecting whether multiple entities share the same address may include examining an amplitude of the negative-going pulses during the response communication. The message and responses may be transmitted in a sequence of negative-going pulses on the power bus. Detecting whether multiple entities have the same address may include causing each of a plurality of entities having the same address to respond after a delay determined by random-number generation so that said entities respond separately in time.

In another aspect, a system for assigning unique identifiers to a plurality of entities connected to a power bus includes a central controller for (i) transmitting a query message over the power bus to each address in an address space, (ii) detecting responses indicative of a plurality of entities assigned to a single address, and (iii) transmitting an address-reassignment message to each of the plurality of entities. Each of the plurality of entities may include a random-number generator for generating a new address in response to the address-reassignment message and/or a read-write memory for storing its address. The central controller may include a read-write memory for storing data relating to the detected responses for each address.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
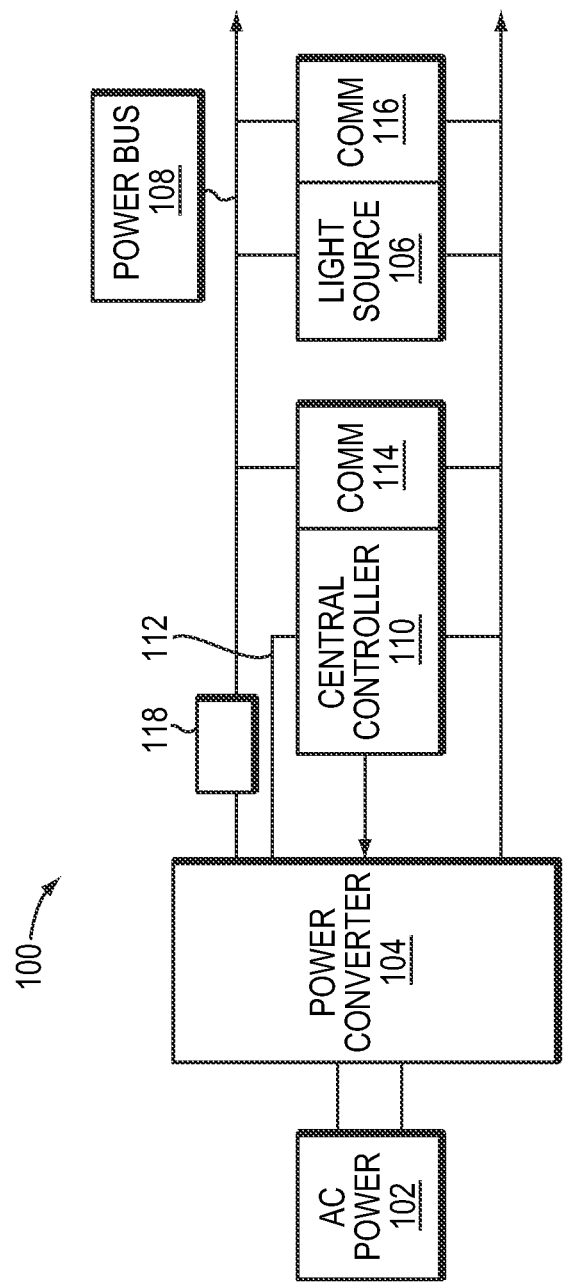
FIG. 1 block diagram of a central controller and a light source in accordance with an embodiment of the invention.

FIG. 1 is a block diagram of a lighting system 100 implemented in accordance with embodiments of the present invention. An AC source 102 (e.g., a household wall socket or other suitable power supply) provides power to a power converter 104, which transforms the input power into a form suitable for powering a light source 106. Only one light source 106 is shown, but the system is capable of supporting a plurality of light sources 106 up to a maximum number supported by the maximum power output of the power converter 104. The converted power may be AC or DC power, in accordance with the requirements of particular applications and is distributed by a power bus 108. A central controller 110 communicates with the one or more light sources 106 using the power bus 108; the central controller 110 may be powered by a separate supply link 112, by the power bus 108, or by any other means. Communication ports 114, 116 may be used by the central controller 110 and light source 106, respectively, to interface with the power bus 108. A switch 118, disposed in series between the power converter 104 and the power bus 108, may be configured in either a low-impedance or high-impedance state, as determined by, e.g., the central controller 110. As explained in greater detail below, the switch 118 may be temporarily placed in a high-impedance state to allow communications among the central controller 110 and the light source 106 using the power bus 108. The light source 106 may have a unique address that allows the central controller 110 to designate it as the sole recipient or source of commands or data, respectively, even if additional light sources 106 are connected to the power bus 108.

Any voltage or frequency may be used by the power converter 104 to supply power to the light source 106 via the power bus 108, and the present invention is not limited to any particular voltage or frequency. Example voltages for the power bus 108 include 12 and 24 V, and example frequencies include 0, 50, 60, or 400 Hz. In one embodiment, the power bus 108 is a low-voltage bus, thereby increasing the safety in distributing power to the light source 106. The power converter 104 may include a voltage regulator (or similar circuit), thereby providing a reliable supply level to a variable number of light sources 106 (e.g., from one to five, ten, twenty, or more light sources 106).

In one embodiment, communications over the power bus 108 are initiated by the central controller 110. The switch 118 may be switched from a low-impedance (or "power mode") to a high-impedance (or "messaging mode") state by the central controller 110 to initiate communications. The central controller may include a digital processor (e.g., an ASIC, digital-signal processor, microcontroller, microprocessor, or other similar device) and/or analog circuitry to interface with the rest of the components in the system 112. An input/output interface may be used to receive commands from and/or send information to a user (via, for example, a USB, Ethernet, wireless, or other similar port). The central controller 110 may be used to turn the light source 106 on and off and/or set the dimming level of the light source 106 via the commands. Other commands from the central controller 110 may be used to configure the lighting system, calibrate the lights and/or measure LED junction temperature for thermal management. The central controller 110 may also include conventional on-board self-test, analysis, and configuration circuitry or algorithms to, for example, detect an over-temperature condition in the light source 106 and automatically reduce the brightness of the light source in response.

As described in greater detail below, a variety of addressing schemes may be used for two-way communication between the central controller and the light source 106. In one embodiment, the central controller 110 communicates with the light source 106 and requests a response therefrom. The central controller 110 then allots a communication response window, during which the central controller 110 is idle with respect to the power bus 108, to allow the light source 106 control of the power bus 108 (i.e., the light source 106 is allowed access to the power bus 108 and may vary the voltage of the power bus 108).

The light source 106 may be a module that includes a microprocessor, LED, LED driver, and/or a communication port 116, connected to the power bus 108. The power supplied to the central controller 110 from the power converter 104 may be separate from the power bus (via, e.g., the link 112) in order to allow the power bus 108 to be switched off while maintaining the power link 112 to the central controller 110. In the light source 106, the microprocessor may regulate the LED current and communicate with the central controller 110 via the power bus 108. The light source 106 may further include DC loads connected to the power bus 108 by rectifiers and/or capacitors for disconnecting the loads from the power bus 108 when the bus 108 is in message mode. The light source 106 may use buck, boost, or combination buck/boost driver circuits for the LEDs therein, depending on available bus voltage and required light voltage. The current invention is not, however, limited to any particular method of powering LEDs, and any system or method known in the art is within the scope of the present invention. The number of light sources 106 in the system 100 determines, at least in part, the total current in the power bus 108; the bus conductor size is selected accordingly to provide an acceptable distribution voltage drop.

Figure 2A:
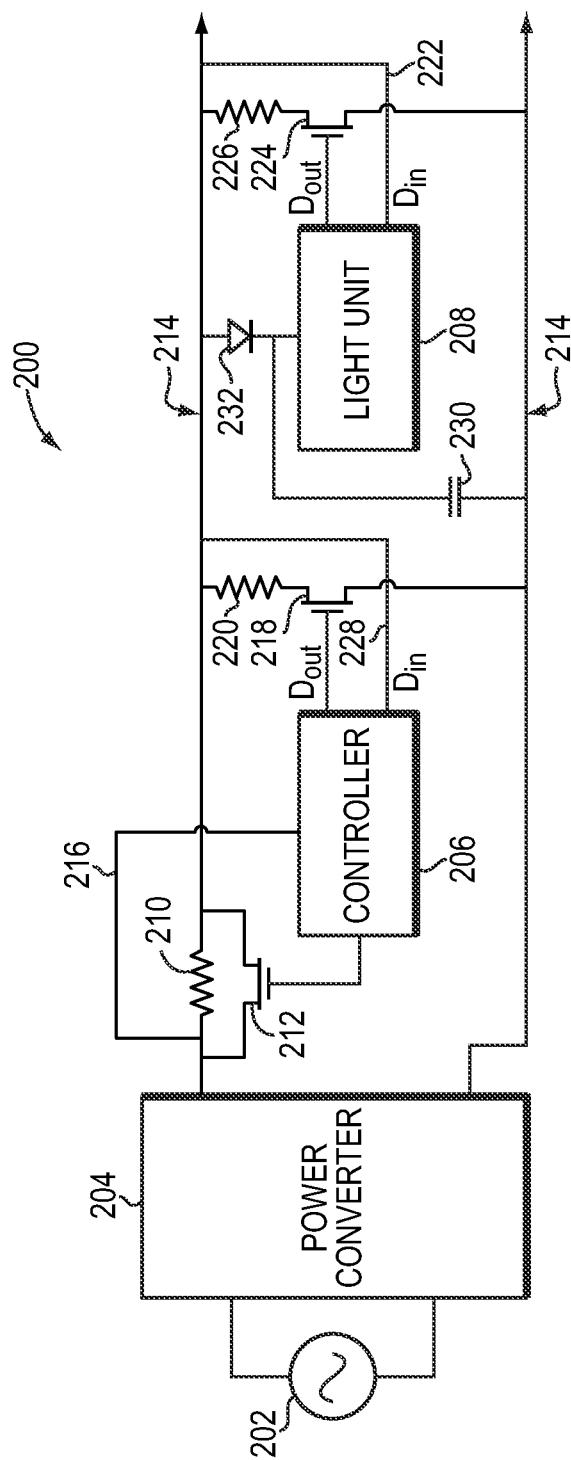
FIGS. 2A and 2B are schematic block diagrams of communication ports in accordance with embodiments of the invention.
Figure 2B:
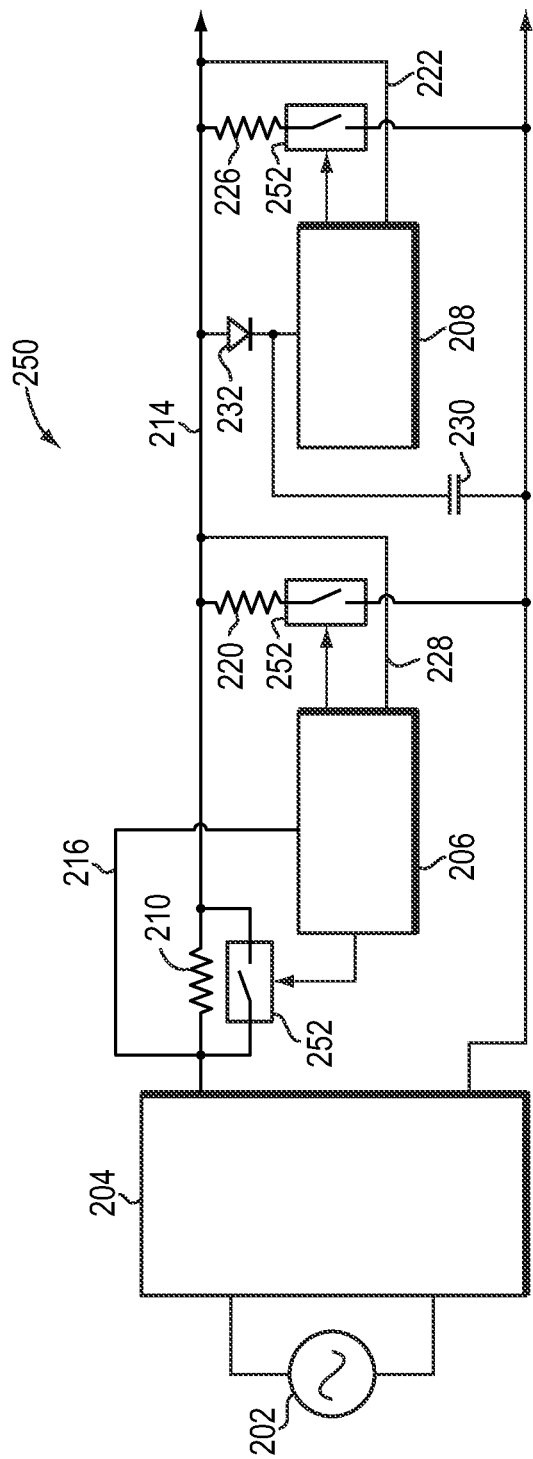

One implementation 200 of a lighting system in accordance with embodiments of the current invention is illustrated in FIG. 2A. An AC source 202, power converter 204, central controller 206, communications port circuitry and light source 208 are disposed in the system 200 as described above with reference to FIG. 1. The switch 118 is implemented using a source load 210 and a field-effect transistor ("FET") 212, the gate terminal of which is controlled by the central controller 206. When an appropriate voltage is applied to the gate of the FET 212 so that a channel forms in the FET between its source and drain, power flows from the power converter 204 to the power bus 214 via the low-impedance path provided by the channel of the FET 212. When the gate voltage of the FET 212 is adjusted such that the FET 212 transitions to a high-impedance state, the source load 210 partially isolates the power converter 204 from the power bus 214, allowing manipulation of the voltage on the power bus 214 in accordance with the communications system described herein. Any type of voltage- or current-controlled switching device may be used, however, and the current invention is not limited to only a switch based on the FET 212. FIG. 2B illustrates, for example, an embodiment 250 using generic switches 252. Power may be supplied to the central controller 206 via a link 216 on the power-converter side of the source load 210 so that power to the central controller 206 is not interrupted by the turning off of the FET 212.

In one embodiment, communication between the central controller 206 and the light source 208 is accomplished by pulling down the voltage on the power bus 214 (e.g., to approximately half the normal DC power voltage) for short durations, i.e., imposing negative pulses onto the power bus 214. The controller 206 may apply a negative pulse to the power bus 214 by activating a second FET 218 to switch in a communication load 220 across the lines of the bus 214. An input port 222 on the light source 208 detects the negative pulses. The light source 208 may similarly assert a negative pulse on the power bus 214 using a FET 224 and communication load 226, and the central controller 206 may detect the pulse at an input port 228.

When the power bus 214 is in message mode (i.e., the FET 212 is switched off and the power converter is separated from the power bus 214 by the source load 210), the light output by the light source 208 may be affected by the variations on the power bus 214. A capacitor 230 may be used to store charge to maintain an LED drive voltage appropriate for the light source 208 during the communication pulses. A diode 232 may be used to isolate the capacitor 230 from lower voltages on the power bus 214 and prevent charge from being siphoned off thereto and affecting message transmission.

The signaling pulses on the power bus 214 may be short-duration negative pulses having duration of approximately 10 µsec, during which time the light source 208 is powered by the capacitor 230. The pulses may be varied in terms of width and interval, or may be of a single width, having a consistent interval between pulses. As described in more detail below, the light source 208 monitors incoming pulses for information encoded in their width, interval, presence, or other attribute and interprets commands based on the received pulses.

In one embodiment, the communication loads 220, 226 are equivalent to the output impedance (i.e., the small internal resistance of the power converter 204 and the relatively larger resistance of the resistor 210) of the power converter 204, thereby producing negative pulses having an amplitude of half the DC power voltage output by the power converter 204. In one embodiment, the central controller 206 and light source 208 receive data from the power bus 214, via the input ports 228, 222, using a comparator having an appropriate threshold between the high and low amplitudes of the bus communication voltages. Lower-amplitude communication pulses may be desirable for electromagnetic compatibility and may be implemented by providing the communication loads 220, 226 with a higher resistor value than the source load 210.

Figure 3:
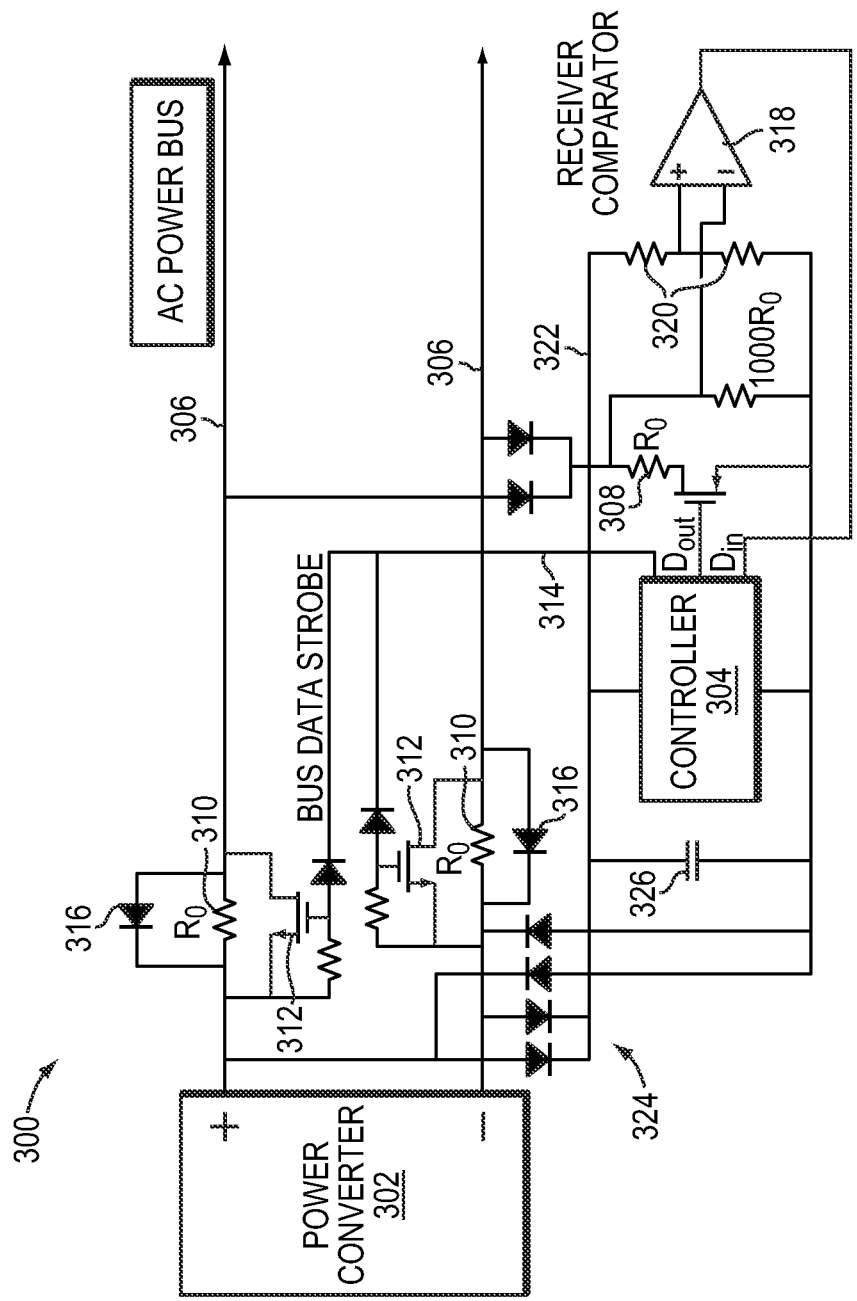
FIGS. 3 and 4 are schematic block diagrams of an interface with an AC power bus in accordance with embodiments of the invention.

FIG. 3 illustrates another embodiment 300 of a power converter 302, central controller 304, and associated communications port circuitry that is, in this case, configured as a message initiator for communicating over an AC power bus 306. Messages may be placed on the power bus 306 by loading the bus with a messaging load 308 and switching the power converter source impedance 310 from low to high impedance, thereby switching the bus 306 from power to messaging mode. The messaging load impedance 308 and source impedance 310 may be matched (i.e., equal) and may each have a value of approximately 200 ohms. Thus, when both loads 308, 310 are enabled, the bus voltage is reduced to approximately half of its nominal, power-mode voltage. With only the messaging load 310 present, the bus voltage remains at nominal voltage until the messaging load 308 is introduced.

The central controller 304 switches or strobes the source load 310 to the messaging load 308, by manipulating the gate voltage of the FETs 312, for short time intervals to produce a signaling pulse on the power bus 306. To place the bus 306 in power mode, the central controller 304 holds a bus-data-strobe signal 314 low, which provides a gate turn-on voltage to the two power FETs 312 that bypass the source loads 310 at the output of the power converter 302. Although two source loads 310 are provided for an AC supply, only one at a time is inserted for messaging, depending on the polarity of the power supply voltage at the time the messaging pulses are introduced. When the data-bus-strobe signal 314 is low, the FET 312 on the positive side of the supply 302 conducts, as does the diode 316 on the negative supply side. When a message pulse is introduced, the data-bus-strobe signal 314 is asserted high, thereby turning off the high-side power FET 312 and inserting the source load 310. When a messaging load 308 is present at the time the strobe signal is asserted, the bus voltage drops to half the bus voltage immediately prior to the messaging mode.

The system 300 may also be configured to receive communication pulses from, e.g., light sources connected to the power bus 306. In this case, the central controller 304 holds the bus-data-strobe signal 314 low, as described above, but does not assert the messaging load 308. The power bus voltage is applied to the input of a comparator 318, which compares the bus voltage to a reference value (generated by, for example, a resistor divider 320). The impedance ratio of the resistors in the resistor divider 320, and the reference value generated thereby, may be determined by the ratios of the impedances of the source and messaging loads 310, 308. Once a light source places a negative pulse on the power bus 306, the voltage on the bus 306 falls below the reference voltage, and the comparator 318 registers this change by sending a command signal to the central controller 304. Any method known in the art of detecting a voltage level may be used to detect the presence of a pulse on the power bus 306, however, and the current invention is not limited to use of a comparator. In one embodiment, different voltage levels on the power bus 306 correspond to different bits of binary information.

The central controller 304, which may include digital logic, may be powered by a local DC power bus 322. The DC voltage on the local bus 322 may be generated from the AC output of the power converter using, for example, a diode rectifier 324 and a filter capacitor 326. The local bus 322 may also be used to supply power to the resistor divider 320, or for any other component or system that requires DC power.

In other embodiments, devices other than the power FETs 312 are used for switching the bus 306 between power and messaging modes. One example of such a device is a gate turn-off thyristor, which may be turned off by a gate signal before zero-conduction current is reached. Another device is a silicon-controlled rectifier or standard thyristor operated using a high-frequency AC supply. At a high AC supply frequency, for example 100 KHz, the bus 306 may be switched to communication mode for the duration of a first AC half-cycle and returned to power mode on the next AC half-cycle. Using such switching methods, a single messag-ing-load resistor may be used. The present invention is not limited to any particular implementation of bus-switching circuit, however, and any equivalent circuits are within the scope of the present invention.

The nominal voltage on the power bus 306 may determine the message signal amplitude. In one embodiment, for the AC power bus case, messaging pulses are placed on the bus 306 only when the bus voltage is greater than a minimum value. The central controller 304 may monitor the bus voltage to assure that the bus minimum voltage is exceeded before beginning a message sequence.

Figure 4:
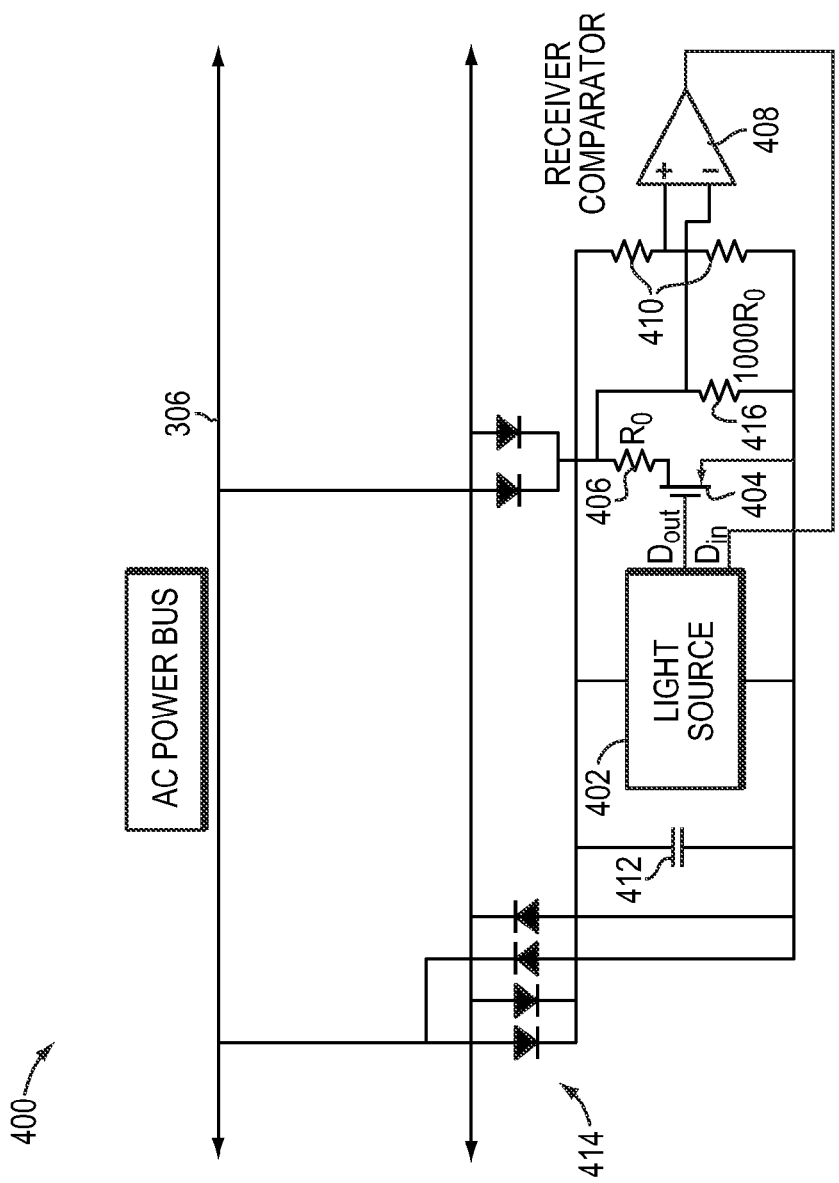

FIG. 4 illustrates an embodiment 400 of a light source 402 and associated communications circuitry configured for communicating over the AC power bus 306. Like the central controller 304, the light source 402 places a pulse on the power bus 306 by asserting a FET 404, thereby pulling the voltage on the power bus 306 down through a message load 406. The light source may receive incoming pulses by monitoring the voltage on the power bus 304 with a comparator 408, which compares the power bus voltage to a reference voltage generated by a resistive divider 410.

When the bus 306 is placed in messaging mode by the central controller 304 (by, e.g., strobing the bus data signal 314), the power converter 302 no longer provides current for the light source 402. Instead, power is provided by one or more filter capacitors 412. In messaging mode, the bus voltage drops until the rectifiers 414 that connect the light source 402 and filter capacitor 412 to the bus 306 stop conducting as the forward-biased junction voltage is reduced. The bus voltage drops further due to the loads presented by the receiver comparator input circuits 410 and the messaging load 406, if asserted. A comparator input resistor 416 is sized at approximately 1000 times the size of the messaging load 406 to assure a low bus voltage is placed at the comparator 408 without significantly loading the bus 306 when multiple loads (i.e., multiple light sources 402) are present. The resistor 416 discharges parasitic capacitance on the bus 306 and receiver input circuit 410 to assure the messaging bus voltage is presented to the comparator 408.

In one embodiment, the responder messaging pulses are placed on the power bus 306 by action of both central controller 304 and light source 402. The central controller 304 strobes the source messaging impedance 314 while the light source 402 has placed (or not placed) a messaging load 406 on the bus 306 to produce a responder message pulse (or lack of pulse). The light source 402 may place the message load 406 on the bus before the strobe occurs; the light source 402 may detect when the strobe occurs by means of a communication clock synchronized to an initiator frame.

Figure 5:
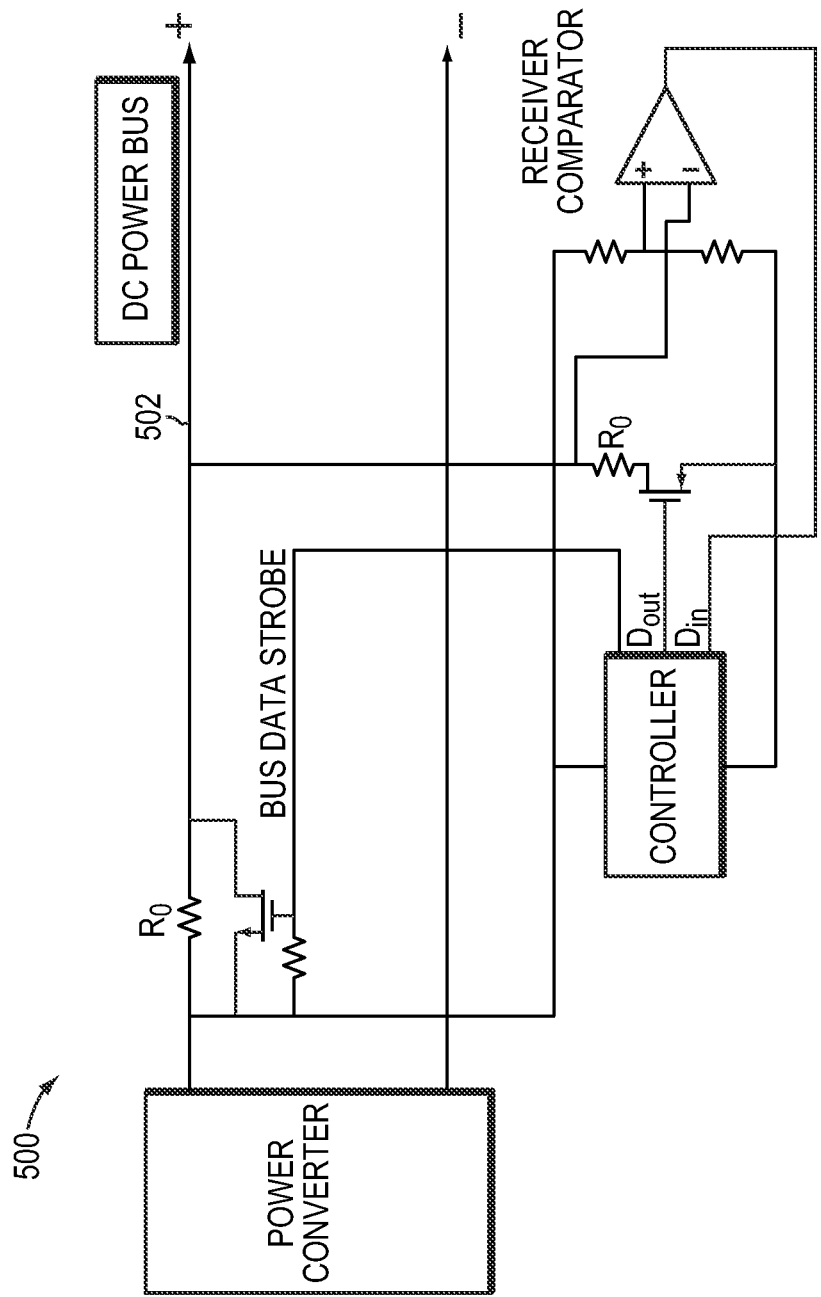
FIGS. 5 and 6 are schematic block diagrams of an interface with a DC power bus in accordance with embodiments of the invention.
Figure 6:
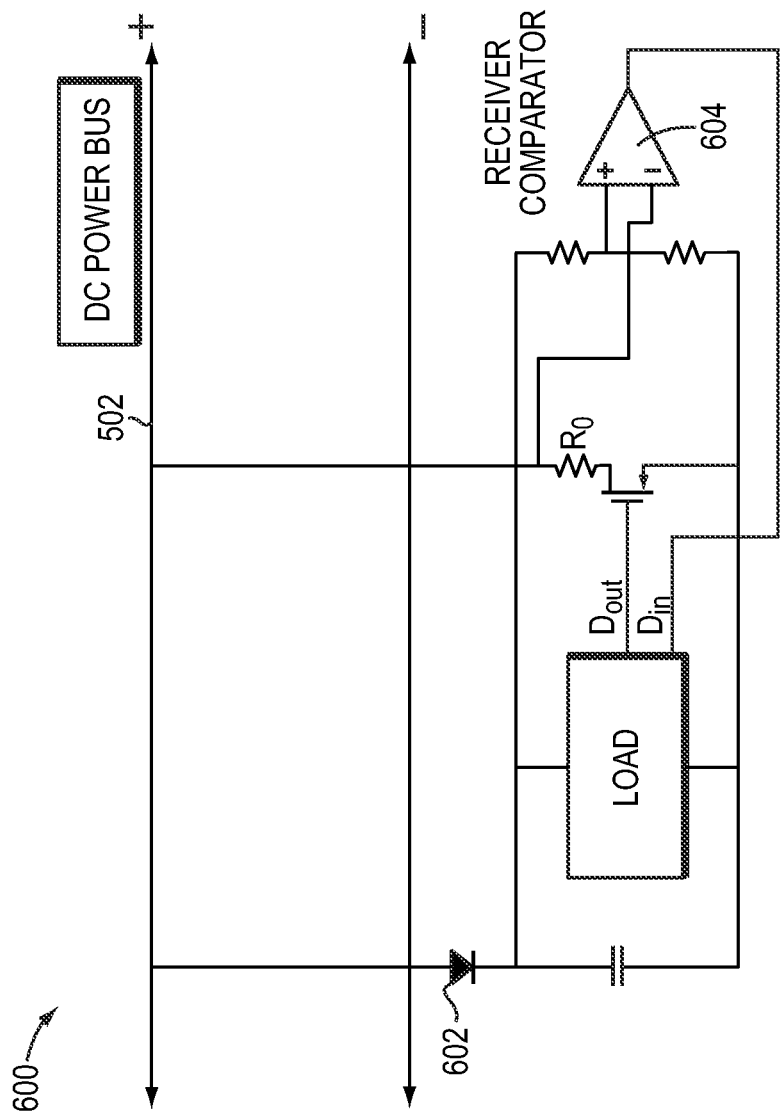

FIGS. 5 and 6 illustrate central-controller 500 and light-source 600 circuits, respectively, for a DC power bus implementation. The modification to the central controller 500 for the DC bus 502 removes one power-converter messaging source impedance, one bypass-power FET, and the full-wave rectifiers for the messaging initiator and its receiver comparator. For the light source of FIG. 6, the full-wave rectifier for the load is replaced by a single diode 602, and the receiver comparator 604 is directly connected to the positive bus conductor 502. The comparator input resistor may be eliminated.

Figure 7:
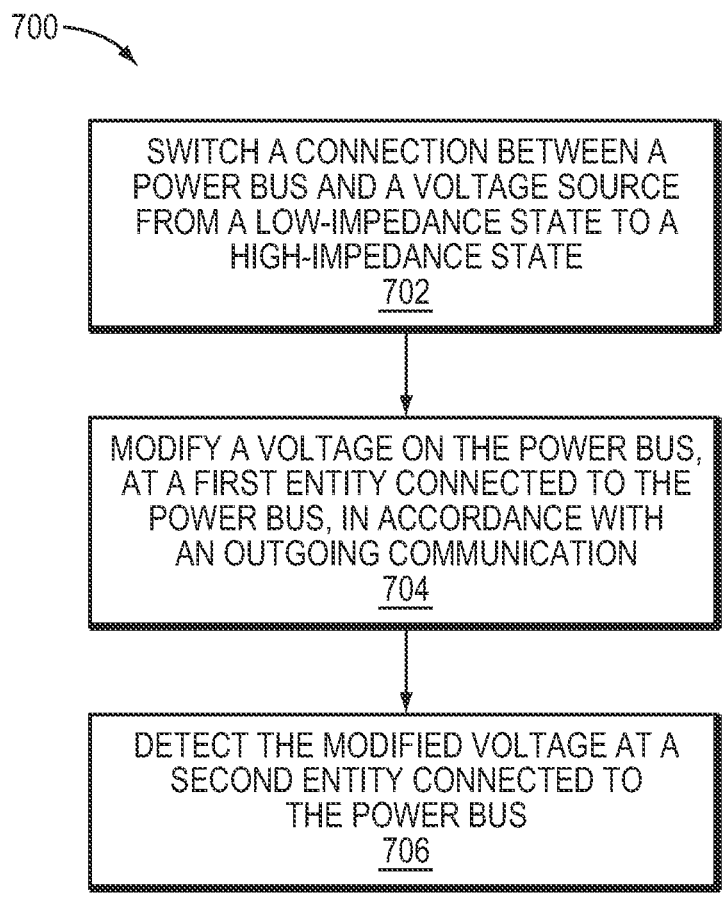
FIG. 7 is a flowchart of a method for communicating among entities on a shared power bus in accordance with an embodiment of the invention.

A method of using an embodiment of the current invention, in accordance with the implementations described above, appears in a flowchart 700 in FIG. 7. With reference also to FIG. 2A, in a first step 702, a connection between the power bus 214 and the voltage source 204 is switched from a low-impedance state to a high-impedance state (using, for example, the FET 212). In a second step 704, a voltage on the power bus 214 is modified at a first entity connected to the power bus, in accordance with an outgoing communication. For example, the central controller 206 may pull down the voltage on the power bus 214 using the FET 218 and the resistor 220; in another embodiment, the light unit 208 sends a communication by pulling down the power bus with FET 224 and resistor 226. In a third step 706, the modified voltage is detected at a second entity connected to the power bus (e.g. the central controller 206 or the light unit 208, using the input ports 228, 222), thereby receiving the communication at the second entity.

When multiple light sources are present in a system, as is often the case, the central controller may need to uniquely identify one of the light sources, determine how many light sources are present, or identify which light source is sending incoming data. Each lighting unit may thus be assigned a unique identifier. When a light source detects, on the power bus, a sequence of pulses corresponding to its identifier, the selected lighting unit may "wake up" in response, in the manner of, for example, a network node responding to a MAC address on a local area network.

In one embodiment, a plurality of light units is each provided with a unique address to allow the central controller to select a particular light source as a recipient of a message. A complete message may include an initiator frame followed by a responder frame. The initiator frame may include a plurality (e.g., four) of fields, such as wake-up, address, command and data fields. The responder frame may include a preamble field and data field. The response frame may be a special field used for address map queries by the initiator. In this embodiment, the response field may be a single long-duration pulse or a single short-duration pulse.

The wake-up field of the communication frame includes a sequence of pulses that identifies the start of a message and provides synchronization to a data clock. The rest of the message may be encoded to maintain self-clocking of the data in the message, as is known in the art, which may assist clock recovery and/or detection at the receiver. Embodiments of the invention may use, but are not limited to, non-return-to-zero ("NRZ") or Manchester transmission protocols. Following the initiator frame, a responder frame is transmitted onto the data bus. The responder frame, sent by the responder, may be assisted by the initiator, which further provides bus data strobes to clock the data onto the bus while the responder controls the messaging load on the bus. The strobe clock continues at the nominal frequency while the responder switches the communication impedance onto the bus and monitors the bus for the expected data pulses.

As noted above, to establish communication and provide thermal management of the lighting units, the central controller may identify and address each lighting unit uniquely. When the lighting system is first installed, or when a lighting unit is added to a system, it is likely that several lighting units have the same communication address. Various approaches to detecting this condition and reassigning addresses are described below.

The lighting units typically have non-volatile memory registers (e.g., electrically erasable programmable read-only memory, or EEPROMs) for storing address information. If non-volatile memory is not provided, then the central controller may reconfigure the lighting units after each power-on cycle. Non-volatile memory allows for monitoring of light-source usage history and its environment, which enables failure prediction for enhanced system reliability. During address configuration, the lighting units may be turned on with a nominal light output setting until configuration is complete. This action may be accomplished using, for example, a global command for turning on the lights.

In one embodiment, an eight-bit address register is used; this register may support up to 255 unique lighting units and, optionally, a reserved address. Registers of any size may be used to support any number of lights, however and the current invention is not limited to any particular register size.

A communication protocol for the lighting system may involve the central controller beginning a communication interval by sending a prescribed set of pulses onto the power bus as a wake-up signal. After the wake-up signal completes, a target address, a command code, and/or optional datafield may be sent by the central controller over the bus; and the command code and/or datafield are recognized by the lighting unit having the target address. Following a send-time interval (to allow for, e.g., the wake-up, address, command, and data fields), the addressed lighting unit may respond by imposing onto the power bus a pulse sequence corresponding to a response code and optional data, which are received by the central controller during a response-time interval. This sequence—the send-time interval and the response-time interval—completes one communication interval. Global commands to all the lighting units may be identified by sending the reserved address instead of a target address.

In one embodiment, to configure unique addresses for each lighting unit, an address occupation map is created for the lighting units in the system. The address occupation map may be arranged as a table or database stored in non-volatile memory of the central controller, and lists the available addresses with the status of unoccupied, single-occupied, or multiple-occupied lighting unit addresses. To populate this table, a query command is sent over the power bus to each of the 255 available addresses requesting a response pulse. For this command, the duration of the response pulse is sufficiently long that multiple lighting units with the same address may simultaneously load the power bus. The central controller can identify if none, one or multiple lighting units occupy the sent address by examining the amplitude of the negative pulse during the response. No lighting unit at the queried address is indicated by no response; one light at the address is indicated by a nominal pulse amplitude; and multiple lighting units are indicated by a larger-than-nominal (lower absolute voltage) pulse. The central controller scans all 255 addresses to build the address occupation map; multiple occupied addresses are reassigned among unoccupied addresses as described below.

In another embodiment, random time delays may be used for the responses to the address-query command in order to separate the responses in time. In this embodiment, each lighting unit at the queried address responds after a random time delay, which is determined by a random-number generator in the lighting unit, and the central controller counts the number of responses for each queried address. The random-number generator may base its output on any available digital or analog signal containing sufficient noise; examples include the analog-to-digital converters for measuring LED current sense voltage or other voltages, the commanded LED current in a closed-loop current regulator, or any other digital or analog signal containing noise. The least-significant bits that are dependent on noise are selected to provide the random number. The random time delay is provided by a time-interval counter preset with the random number. After the random time delay, the lighting unit responds by applying pulses to the power bus if no other lighting unit is currently responding. If another lighting unit's response is in progress, as determined by the current state of the power bus, the lighting unit further delays its response, thereby ensuring that simultaneous responses do not occur. The absence of a response indicates that the queried address is unassigned; one lighting unit at the address is indicated by one response; and multiple lighting units are indicated by more than one response. The central controller may store this information for the queried address and scan all 255 addresses to complete the table.

In one embodiment, when multiple lighting units occupy an address, the central controller reassigns addresses by sending an address-reassignment command to the lighting units sharing one address, along with an available unoccupied address in the data field. Upon receiving this command, the lighting units randomly decide to assume the new address or retain the original address. This decision may be based on a random-number generator in each lighting unit; the random numbers may be generated as described above. The least-significant bit of the data word is selected to decide whether or not to assign a new address for the lighting unit. With the lighting units independently assuming one of two addresses in this random process, the central controller may then scan the two addresses and update the stored table of unoccupied, single, and multiple occupied addresses of the original address scan. The address reassignment sequence is iterated until all lighting units have been assigned unique addresses. Alternatively, the number of addresses that are randomly selected by the lighting units may be increased by using more data bits in the random number. For example, two bits provide for selection among four addresses, three bits provide eight addresses, and so on.

In another embodiment, the lighting units randomly select address extensions to assign themselves unique addresses. In this approach, the lighting units that share a common address are commanded by the central controller to randomly select a number in a predetermined range as an address extension to their base addresses. A random number generator, as described above, may be used to select the address extension, which is the required number of least-significant bits of a noisy digital signal. An example of the range of numbers for the address extension is 0 to 15 (in hexadecimal, 0x0 to 0xF) defined by a 4-bit binary number, but any convenient range may be used. To address a light source by its address plus address extension, the base address is sent with a command defined for an address extension followed by the address extension in the data field. In this way, the central controller scans the sixteen (e.g.) address extensions at the shared address to create a list of single-occupied extensions and multiple-occupied extensions. Both the single- and multiple-occupied extensions may be reassigned available unique base addresses, and the original table of unoccupied, single-, and multiple-occupied addresses is updated with this change. In sequence, all multiple occupied addresses are commanded to randomly select new address extensions, then scanned and reassigned new unoccupied addresses and the occupation table updated. This process may proceed through all multiple-occupied addresses until all lighting units are reassigned unique addresses.

In some embodiments, addresses may be manually assigned. This approach may be advantageous, for example, when one or more lighting units are added or replaced in the lighting system. This approach ensures that usage and temperature history data for the lighting units, stored in, e.g., non-volatile storage in the central controller, remains valid when the system is serviced or altered by adding or replacing lighting units. One implementation uses a polling scheme for the central controller to query the lighting units for a system change status. The lighting units are each provided with a non-volatile memory location (e.g., one or more data bits in EEPROM), which is set during manufacturing to indicate that the lighting unit has not been configured. This memory location may also be set manually, after a service procedure, to indicate that the lighting unit requires address configuration and possibly other procedures for tracking usage history. A switch may be provided on the lighting unit to manually set the EEPROM to request configuration.

The central controller may poll the lighting units with a command to the reserved common or global address. Any lighting units with the condition set in EEPROM indicating an unconfigured status may respond to this poll. If there is a response to the poll, the central controller assigns an available unused address to the responding lighting unit or units, which then reset the EEPROM condition to indicate that configuration is no longer needed. The central controller proceeds through the above-described procedures to assign unique addresses if multiple lighting units share the newly assigned address. The polling command may be issued periodically by the central controller, or it may be initiated by the service person by operating a switch on the controller.

Figure 8:
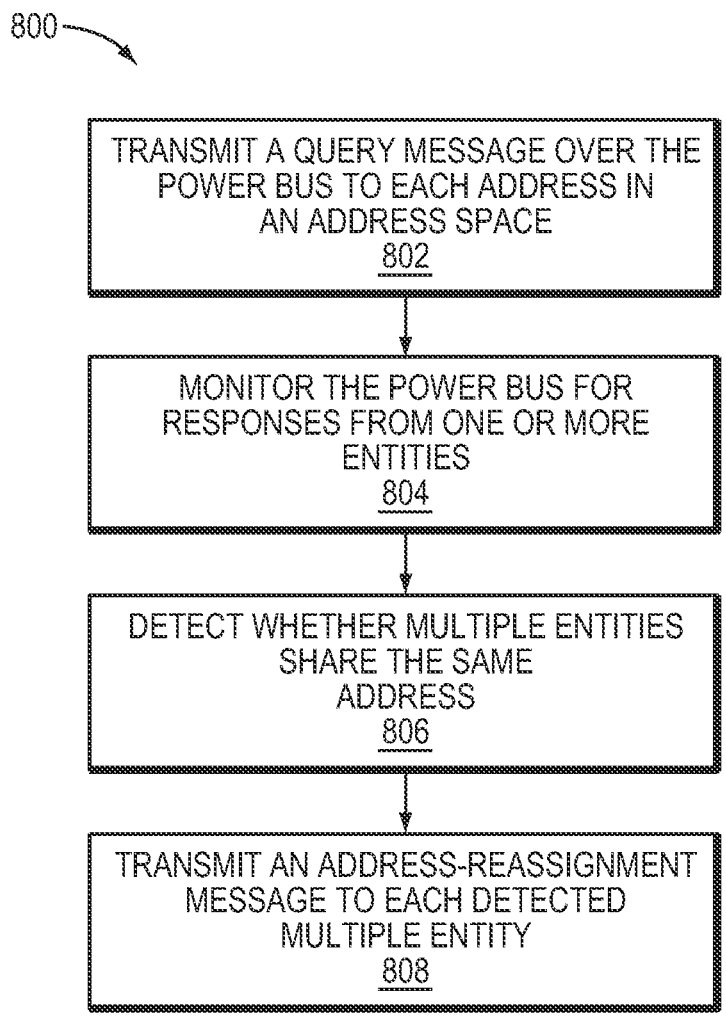
FIG. 8 is a flowchart of a method for detecting and reassigning addresses for entities initially assigned the same address in accordance with an embodiment of the invention.

One embodiment of a method for assigning unique identifiers to a plurality of entities (e.g., light sources) connected to the power bus is shown in FIG. 8. In a first step 802, a query message is transmitted over the power bus to each address in an address space used by the plurality of entities. In a second step 804, the power bus is monitored (by, e.g., the central controller), for each queried address, for a response from one or more entities. In a third step 806, whether multiple entities share the same address is detected based on the response communication. In one embodiment, the central controller determines whether zero, one, or more than one light sources are assigned the address by monitoring the level of the voltage on the power bus, as described above. In a fourth step 808, an address-reassignment message is transmitted (e.g., by the central controller) to each detected multiple entity.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of communication among a plurality of entities connected to a power bus powered by a power supply having a power supply voltage, the method comprising:

switching a connection between the power bus and the power supply from a low-impedance state to a high-impedance state by inserting a source load between the power bus and the power supply;

modifying a voltage on the power bus such that the modified voltage is less than the power supply voltage but greater than zero in accordance with the impedance ratio of the source load and a messaging load, at a first entity connected to the power bus, in accordance with an outgoing communication, by inserting the messaging load between the power bus and ground such that the source load and messaging load divide the power supply voltage on the power bus; and detecting the modified voltage at a second entity connected to the power bus, thereby receiving the communication at the second entity.

2. The method of claim 1, wherein the first entity comprises a central control unit and the second entity comprises a light source.

3. The method of claim 2, wherein the outgoing communication comprises a command to modify a property of the light source.

4. The method of claim 2, further comprising detecting the modified voltage at an additional light source connected to the common power bus.

5. The method of claim 4, wherein the communication uniquely addresses one of the light source or the additional light source.

6. The method of claim 1, wherein the first entity comprises a light source and the second entity comprises a central control unit.

7. The method of claim 6, wherein the outgoing communication comprises a status of the light source.

8. The method of claim 1, further comprising, after detecting the modified voltage, switching the connection between the power bus and the power supply from the high-impedance state to the low-impedance state.

9. The method of claim 1, wherein sending the communications signal comprises sending a wake-up signal.

10. The method of claim 1, further comprising encoding the communications signal.

11. The method of claim 1, wherein sending the communications signal comprises sending an entity identification signal.

12. The method of claim 1, wherein the entities include light sources, and further comprising the step of maintaining a sufficiently constant voltage at the light sources to avoid degradation, detectable to a human eye, of emitted light during negative-going pulses.

13. A system for communicating among a plurality of entities powered by a power supply having a power supply voltage via a power bus, the system comprising:

an impedance-switching circuit electrically connected between the power supply and the power bus for selecting between a power-supply output impedance and a source load, the source load having an impedance higher than the power-supply output impedance;

a central controller for selecting, using the impedance-switching circuit, the source load to thereby place the power bus in a command mode and, thereafter, sending a command over the power bus by inserting a messaging load between the power bus and ground to thereby modify a voltage on the power bus to be less than the power supply voltage but greater than zero in accordance with the impedance ratio of the source load and a messaging load such that the source load and messaging load divide the power supply voltage on the power bus; and a light source for receiving the command, over the power bus, from the central controller and sending a response over the power bus thereto.

14. The system of claim 13, wherein the central controller comprises a comparator for detecting a negative pulse on the common power bus.

15. The system of claim 13, wherein the power bus is one of a DC bus or an AC bus.

16. The method of claim 1, wherein a resistance of the source load is approximately equal to a resistance of the messaging load and the modified voltage is approximately one-half of the power supply voltage.

17. The system of claim 13, wherein the messaging load has a resistance approximately equal to a resistance of the source load and the modified voltage on the power bus is approximately one-half of the power supply voltage.

18. The method of claim 1, further comprising receiving a communication from the second entity by (i) modifying the voltage on the power bus such that the modified voltage is the power supply voltage; (ii) at the second entity, modifying the voltage on the power bus such that the modified voltage is less than the power supply voltage but greater than zero in accordance with the impedance ratio of the source impedance and a second messaging load at the second entity, and (iii) detecting the voltage modified by the second entity.

19. The system of claim 13, wherein the light source is configured to modify the voltage on the power bus such that the modified voltage is less than the power supply voltage but greater than zero in accordance with the impedance ratio of the source impedance and a second messaging load at the light source, and wherein the central controller detects the voltage modified by the second entity.

* * * * *